United States Patent [19]

Ohara

[11] 4,295,748
[45] Oct. 20, 1981

[54] MOUNTING STRUCTURE FOR MAGNETRONS

[75] Inventor: Ichiro Ohara, Mobara, Japan

[73] Assignee: Hitachi, Ltd., Tokyo, Japan

[21] Appl. No.: 4,292

[22] Filed: Jan. 18, 1979

[30] Foreign Application Priority Data

Jun. 9, 1978 [JP] Japan ............................. 53-77920[U]

[51] Int. Cl.³ ............................................. F16B 17/00
[52] U.S. Cl. ........................................ 403/24; 403/14; 403/337
[58] Field of Search ....................... 85/1 P; 403/13, 14, 403/337, 336, 335, 338, 24; 285/412, 368, 24, 27

[56] References Cited

U.S. PATENT DOCUMENTS 2,429,833 10/1947 Luce ....................................... 85/1 P
2,643,139 6/1953 Hamilton ............................... 285/27

FOREIGN PATENT DOCUMENTS 378619 7/1964 Switzerland ......................... 285/368
801661 9/1958 United Kingdom .................. 85/1 P
148660 of 1962 U.S.S.R. ................................ 85/1 P Primary Examiner—Andrew V. Kundrat
Attorney, Agent, or Firm—Charles E. Pfund

[57] ABSTRACT

When mounting a magnetron to the flange of a wave guide, a stud bolt studded in a mounting plate secured to the magnetron is passed through a bore in the flange and tightened with a nut on the side of the flange. The stud bolt has a tip portion without threads having a diameter which is equal to or slightly smaller than the diameter of bottom of thread of the stud bolt.

1 Claim, 5 Drawing Figures

MOUNTING STRUCTURE FOR MAGNETRONS

BACKGROUND OF THE INVENTION

This invention relates to a mounting structure for the magnetrons which can easily mount a magnetron to a wave guide by means of stud bolts.

FIG. 1 illustrates a prior art magnetron having stud bolts for a mounting structure. In the figure, reference numeral 1 designates a magnetron, 2 a stud bolt, 3 a nut, 4 a washer, 5 a waveguide, 6 a high-frequency power output antenna and 7 a mounting plate secured to the magnetron. The high-frequency output from the magnetron is usually guided by the wave guide to the location at which the output is used. In this case, the magnetron is usually mounted to a flange 5a secured to the wave guide 5 by using the stud bolt which is, as shown in FIG. 1, studded in the mounting plate 7 of the magnetron. As shown in FIG. 1 in a somewhat exaggerated manner, however, the stud bolt 2 tends to be studded obliquely in the mounting plate 7 of the magnetron 1 with the result that the necessary positioning of the tip of the stud bolt 2 is impared for engagement with the nut. When the area surrounding the wave guide 5 or the magnetron 1 is open, it is sometimes possible to connect the magnetron 1 to the wave guide 5 while correcting the oblique posture of the stud bolt. In practical applications such as in electronic ovens to which the magnetron is at present extensively applied, however, the utilization device of the magnetron is so designed as to be minimized in size. Therefore, if the stud bolt 2 is obliquely studded as shown in FIG. 1, it is impossible to pass the stud bolt 2 through a bore 5b formed in the flange 5a of the wave guide 5. Even though the stud bolt is studded very carefully without being postured obliquely and is passed smoothly through the bore 5b of the wave guide, there still remain difficulties with correctly engaging and mating the nut 3 with the threaded tip of the stud bolt 2. In many applications, the surroundings where the mangetron is mounted are very tight, and even if the nut can initially be engaged with the tip by fingers, it is difficult from standpoint of routine workability, to turn the stud bolt enough to ascertain that it is correctly engaged with the tip thread. And, even if the nut is, as shown in FIG. 2, in a state of being obliquely received by the end of the stud, it is often erroneously determined that the nut is engaged with the stud end when viewed from above. A hand or auto box spanner is frequently used to tighten the nut, but if the nut is tightened as it is in an oblique state, the thread at the end of the stud is damaged and in the long run it becomes impossible to tighten the nut. Further, in order that the stud bolt is correctly studded by an automatic tool in the course of the mass production, it is necessary not only to correctly fix the mounting plate of the magnetron but also to seize the end of the stud bolt for guiding the stud bolt in the correct direction. However, the thread of stud bolt is fragile and tends to deform when the screw thread of the stud bolt end is seized and bitten by a seizing tool. The stud bolt thus deformed can by no means be mated with the nut.

SUMMARY OF THE INVENTION

An object of this invention is to provide a mounting structure for magnetrons capable of eliminating the aforementioned drawbacks of the prior art mounting structure utilizing stud bolts.

According to this invention, there is provided a mounting structure for magnetrons comprising a flange secured to a wave guide to be mounted with the magnetron, a mounting plate secured to the magnetron, and a stud bolt studded in the mounting plate and having a tip portion without threads having a diameter which is equal to or slightly smaller than the diameter of bottom of thread of the stud bolt, whereby the stud bolt is passed through a bore formed in the flange and tightened with clamping means on the side of the flange.

When using the stud bolt of this invention, it is possible to seize and guide the tip portion without threads and to stud the bolt by an automatic tool. At this time, the seized tip, which is removed of the fragile screw thread, will not be damaged. Also, when engaging the nut with the stud bolt, the tip portion without threads having the diameter sightly smaller than that of bottom of thread of the stud bolt can fit the threaded bore of the nut smoothly, then the nut is now ready for being correctly mated with the stud bolt only by turning the nut. Thus, the stud bolt can smoothly be tightened. In both cases of studding the stud bolt and tightening the nut by an automatic tool, such common considerations are of course required that the end of the not-threaded tip portion of stud bolt is suitably chamferred or bevelled, and that the axial length of the not-threaded portion is substantially the same as the thickness of the nut.

DESCRIPTION OF THE PREFERRED EMBODIMENT

Figure 1:
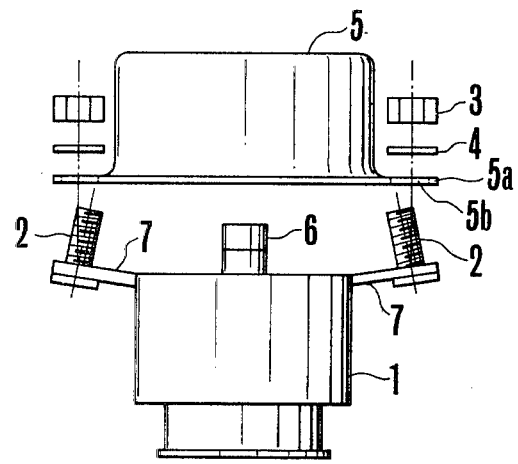
FIG. 1 is a side view of a prior art mounting structure for magnetrons utilizing the stud bolt.
Figure 2:
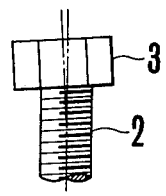
FIG. 2 is a side view to show the nut which is obliquely engaged with the end of stud bolt.
Figure 3:
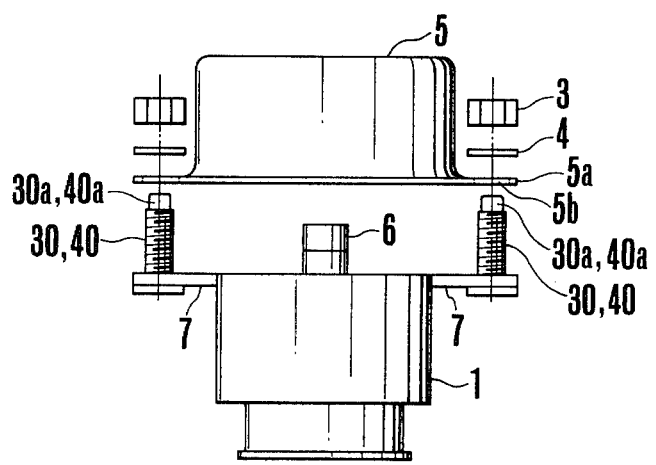
FIG. 3 is a side view of a mounting structure embodying the invention.

As shown in FIG. 3, a mounting structure of the invention is incorporated with two stud bolts 30 (or 40) each having a tip portion 30a (or 40a) without threads. The not-threaded tip portion 30a (or 40a) is convenient for seizing so that the mounting plate 7 can lie substantially horizontally by seizing the tip portion and applying it with a suitable moment force in order to ensure correct alignment of the stud bolt with a bore 5b in a flange 5a.

Figure 4:
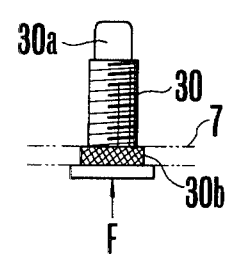
FIGS. 4 and 5 show forms of the stud bolts incorporated in the invention.

In FIG. 4, an example of the stud bolt used for the mounting structure of this invention is illustrated. The stud bolt 30 has the tip portion 30a without threads having a diameter which is equal to or slightly smaller than the diameter of bottom of thread of the stud bolt, and a knurled portion 30b at the base. The stud bolt 30 is upright studded in the mounting plate 7 by forcibly fitting the knurled portion 30b in a bore formed in the mounting plate 7 under the application of a force designated at F in FIG. 4. In such an operation, it is, needless to say, necessary that the peripheral edge of the bore in the mounting plate 7 is not raised when applied with the force F.

Figure 5:
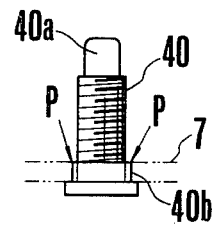

FIG. 5 shows another example of the stud bolt having a base which is threaded as shown at 40b. The mounting plate 7 is also formed with a threaded bore, and the threaded base is mated with the threaded bore. Thereafter, the so-called punch is given on the portion designated at P in the figure so that the mating is not loosened. Alternatively, the stud bolt may be uprightly studded by welding.

As has been described, the present invention can provide the mounting structure for magnetrons which ensures easy and steady mounting of the magnetron to the wave guide by means of the simple stud bolt and is suitable for mass-production.

What is claimed is:

1. A mounting structure for magnetrons comprising a flange having bolting bore-holes therein secured to a wave guide to provide a surface side to be mounted with the magnetron, a mounting plate secured to said magnetron, and a plurality of stud bolts each having a head, a mounting portion adjacent said head, threads and a tip portion without threads having a diameter which is equal, at the most, to the diameter of bottom of thread of said stud bolt, fastening means operative on said mounting portion of said stud bolts with said tip aligned with said bore-holes for permanently fixing said stud bolts integral with said mounting plate and clamping means aligned by said tips for engaging said threads on said stud bolts passed through said bore-holes and tightened by rotating said clamping means on said tips as an axis on the other side of said flange.

* * * * *